Dec. 9, 1958  J. A. LETTENEY  2,863,962
VEHICLE SPEED CONTROL SYSTEM
Filed Aug. 25, 1955  4 Sheets-Sheet 1
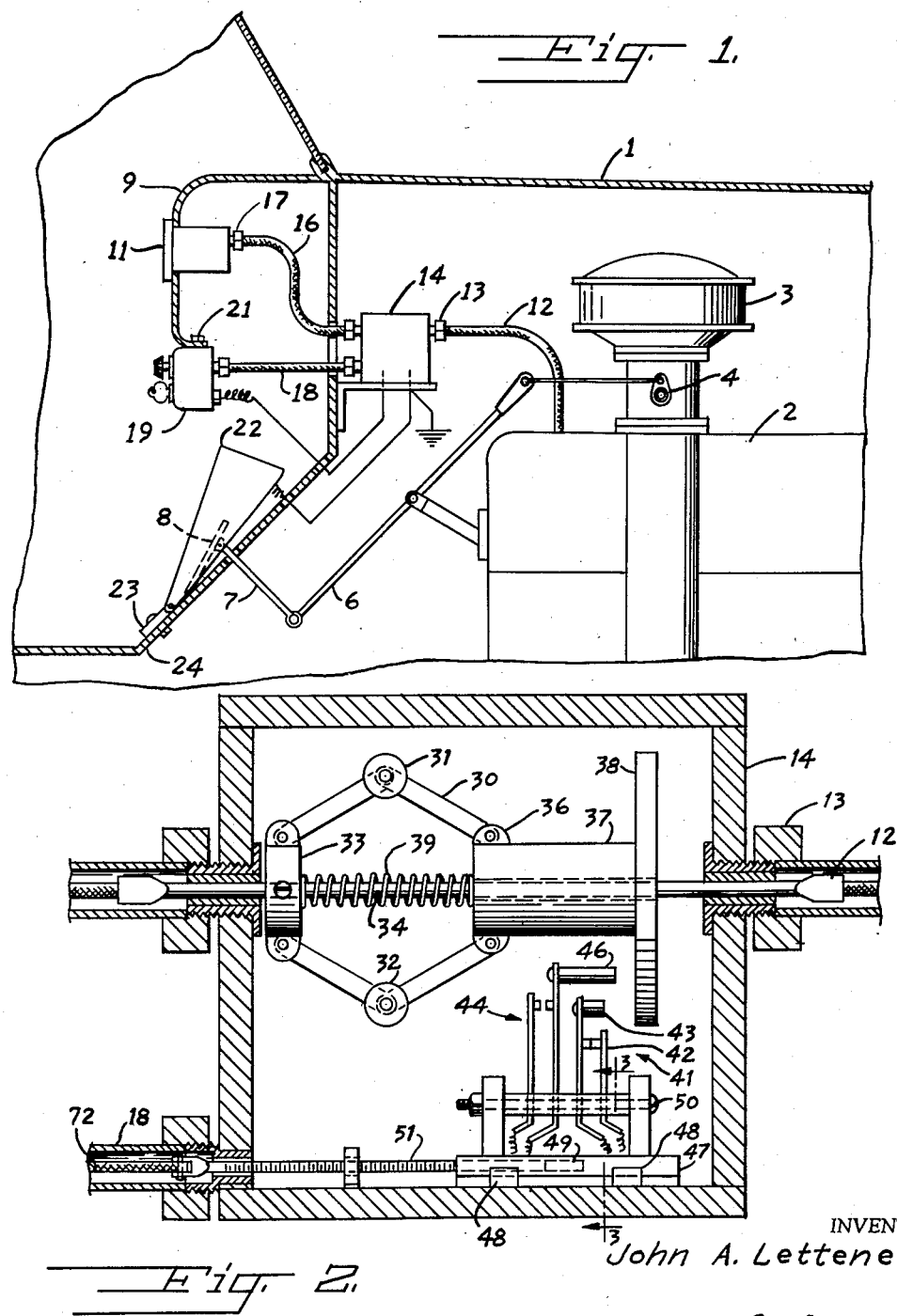
INVENTOR
John A. Letteney
BY Max L. Libman
ATTORNEY Dec. 9, 1958 J. A. LETTENEY 2,863,962
VEHICLE SPEED CONTROL SYSTEM
Filed Aug. 25, 1955 4 Sheets-Sheet 2

INVENTOR
John A. Letteney

BY Max L. Libman

ATTORNEY

Dec. 9, 1958  J. A. LETTENEY  2,863,962
VEHICLE SPEED CONTROL SYSTEM
Filed Aug. 25, 1955  4 Sheets-Sheet 3
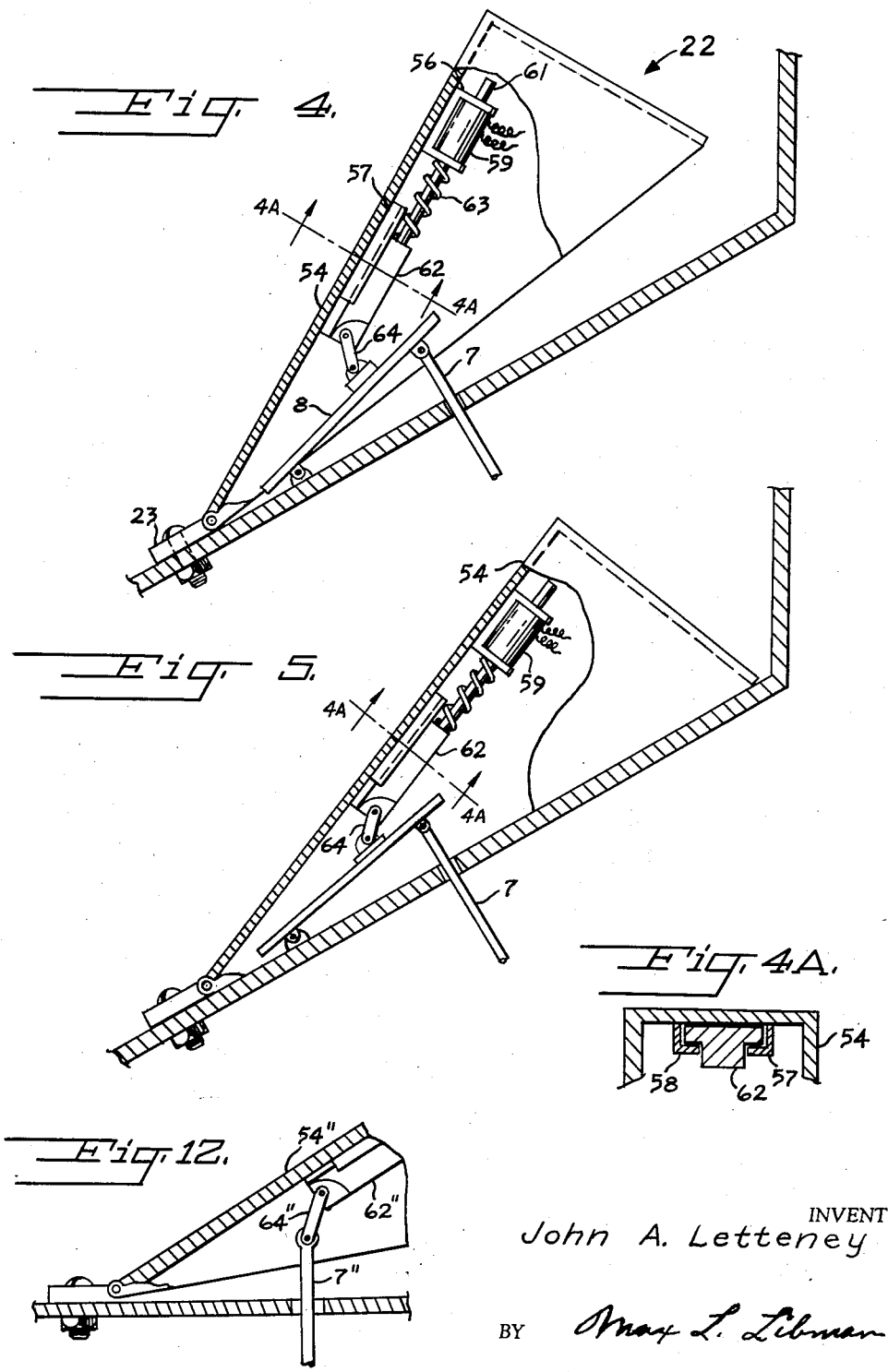
INVENTOR
John A. Letteney
BY *Max L. Libman*
ATTORNEY

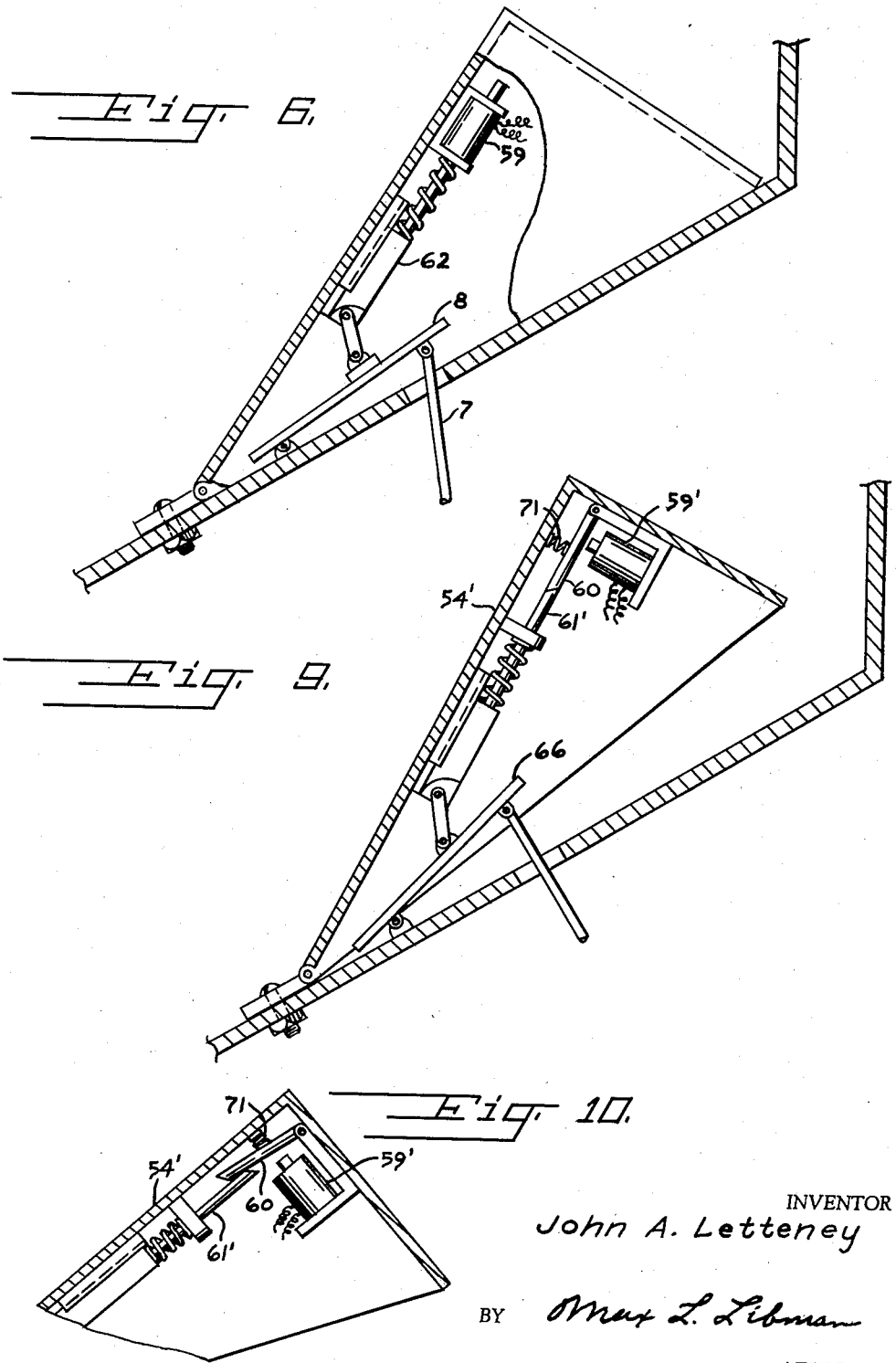

United States Patent Office 2,863,962
Patented Dec. 9, 1958

2,863,962

VEHICLE SPEED CONTROL SYSTEM

John A. Letteney, North Lancaster, Mass., assignor, by mesne assignments, to John A. Letteney, North Lancaster, Mass., and Hyman L. Federman, New Rochelle, N. Y.

Application August 25, 1955, Serial No. 530,519

9 Claims. (Cl. 200—61.89)

This invention relates to a speed control system for vehicles and has for its primary object the provision of a speed governor system for limiting the maximum speed of the vehicle, and which can be preset for a desired top speed so that the driver of the vehicle cannot exceed such preset speed.

It is often desirable for a person who owns or has responsibility for an automotive vehicle to be able to set a definite speed limit above which the vehicle cannot be driven. This is particularly the case when a parent permits a child to drive the vehicle or when the owner of a truck or other commercial vehicle must allow it to be driven by his employees, etc. Speed governors for use under such conditons, are known, and most such governor systems which are capable of satisfactory performance have the disadvantage that they are expensive and complicated in construction, and difficult to install in the vehicle; or else that they require substantial modification of the vehicle, which means that they must be built into the vehicle during manufacture, or installed by highly skilled help.

It is a primary object of my invention to provide a speed limiting system which is relatively simple and inexpensive in construction, which can be installed in any existing vehicle with no substantial alteration of the existing vehicle components, and which requires no special skill or training to install or use.

Another object is to provide a speed limiting system which can be preset and locked by the person responsible for the vehicle so that it cannot be changed, disabled or circumvented except with the greatest of difficulty, and in which it will be readily apparent thereafter that the device has been tampered with.

Still another object is to provide a speed control system which will not adversely affect the normal operation of the vehicle or its engine, or diminish the amount of power available for special needs, as in hill-climbing, passing another vehicle, or accelerating, so long as the preset speed limit is not exceeded.

Still another object is to provide an electrically controlled speed governor system so designed that if the electric circuit is wilfully interrupted, as by being cut by the driver, he will then lose all control of the gas speed and be unable to drive the vehicle.

According to the invention a special floor board gas accelerator pedal is provided which is connected to the normal foot-throttle gas control linkage by means of a mechanical connection which is automatically disabled whenever the predetermined speed is exceeded so that above the predetermined speed the driver loses control of the gas feed. Preferably this is accomplished by providing a normally-closed electrically controlled mechanical connection between the special gas pedal and the normal gas-control linkage; a settable speed-control switch is set to open the normally-closed circuit at the maximum speed at which it is desired that the vehicle shall be driven so that the mechanical connection is then broken and the driver loses control of the gas feed, so that the vehicle then slows down toward idling speed, whereupon the driver can regain control of the gas speed of the vehicle. A key-controlled setting device is provided whereby the system may be locked at the desired setting so that it cannot thereafter be tampered with. A warning signal may also be provided, under control of the vehicle speed, which will give an audible or visual warning that the vehicle speed is approaching the point at which the governor will take control.

The specific nature of my invention as well as other objects and advantages thereof will clearly appear from a description of a preferred embodiment as shown in the accompanying drawings, in which:

Fig. 1 is a schematic diagram showing the principle of operation of the invention;

Fig. 2 is a schematic sectional view of the speed-controlled presettable electric switch;

Fig. 4 is a side view partly broken away showing the pedal mechanism in the idling position;

Fig. 4A is a sectional view taken on line 4A—4A of Fig. 4;

Fig. 5 is a view similar to Fig. 4, showing the pedal mechanism in the disabled position immediately after the set speed limit has been exceeded;

Fig. 6 is a view similar to Fig. 4 showing the pedal fully depressed at a speed within the preset limit;

Fig. 9 is a sectional side view of a modified form of gas pedal control in the latched position;

Fig. 10 is a sectional view of the latching portion of Fig. 9, in the unlatched position;

Fig. 12 shows a modified form of the invention.

Figure 3:
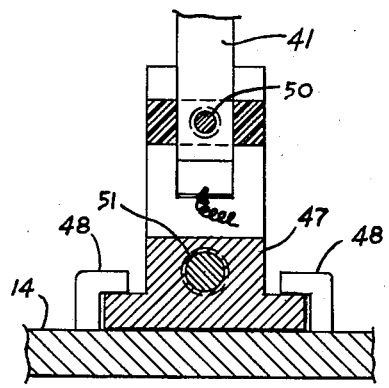
Fig. 3 is a sectional view taken on line 3—3 of Fig. 2.

Referring to Fig. 1, the invention is shown as applied to a conventional passenger automobile, wherein the hood 1 is of the usual construction protecting the engine 2, having the carburetor 3 controlled by the usual valve 4, which is operated through any suitable linkage 6 by push-rod 7 of a standard foot-accelerator gas pedal 8. Mounted on dash board 9 of the vehicle is a conventional speedometer 11 generally driven by a speedometer cable 12 suitably connected to be driven from one of the front wheels of the vehicle. Cable 12 is equipped with a conventional screw connection 13, which, for the purpose of the present invention is unscrewed from the speedometer 11 and screwed to a suitable fitting on the housing 14 of a speed-controlled electric switch. A suitable length of similar cable 16 which extends from the opposite side of housing 14 is then screwed to the speedometer housing at 17 whereby, as will be shown below, the forward motion of the vehicle is transferred to the speedometer as before. In this way it will be seen that no special tools or equipment are required to install the speed-controlled switch in the vehicle.

Another short length of protected rotary cable 18 extends from housing 14 to housing 19 of the key-controlled setting device for the governor. Housing 19 is suitably fastened to the bottom edge of dashboard 9 in any conventional manner, as by screw or pivot 21.

Gas pedal 8 of the vehicle is overlaid by a special auxiliary gas pedal housing 22 which is connected to a hinged plate 23 which in turn is pivoted or otherwise suitably fastened to the floor board of the vehicle in such manner that it cannot be readily removed or tampered with. The internal arrangement of the auxiliary gas pedal is such, as will be shown in detail below, that normally pressure of the foot on the auxiliary gas pedal is transferred to the standard gas pedal 8 to provide control of the gas feed to the engine. However, on overspeed, this coupling between the two gas pedals is disabled so that even if the auxiliary gas pedal 22 is fully depressed, the engine will run only at idling speed.

Referring to Fig. 2, the construction of the speed-controlled electric switch will be shown. Mounted in housing 14 is a centrifugal governor 30 having two weights 31, 32, hingedly fastened to collar 33 which rotates with shaft 34 which is now connected to the rotating central shaft of speedometer cable 12. The other end of the governor is hingedly connected at 36 to sleeve 37 which carries with it switch actuator plate 38 so that the position of plate 38 depends on the speed of the vehicle. When the vehicle is at rest, plate 38 is urged to the right by spring 39, and as the vehicle speed increases, outward movement of the centrifugal governor weights causes plate 38 to move to the left in accordance with the speed of the vehicle.

Mounted in the path of plate 38 is the composite electrical switch 41 having a normally-closed switch element 42 which is opened when plate 38 contacts switch button 43 which is preferably made of suitable wear-resistant material such as hard fiber to withstand the rubbing contact of plate 38 when the rapidly rotating plate engages the button 43. A second, normally opened switch 44 is provided with a similar button 46 of sufficient length so that switch 44 is closed slightly before switch 41 is opened as plate 38 moves toward the left. As will be shown below, switch 48 controls an alarm circuit to indicate that the vehicle is approaching the speed at which the switch 41 will be opened to disable the gas feed. The entire switch assembly 41, 44, is preferably of conventional telephone switch stack construction and is mounted upon sliding base 47 which is restrained by guides 48 for limited movement to the right and left whereby the position of the switch assembly with respect to the housing 14 determines the speed at which the switches are actuated. Any suitable means may be provided for controlling the position of base 47 and thereby the speed setting of the governor, for example, base 47 may be provided with a tapped hole 49 into which a threaded rod 51 partially extends, so that as the rod is rotated the switch assembly may be moved to the right or left. Means are provided, as will be shown below, for rotating rod 51 from the driver's position to obtain the desired speed setting.

Fig. 4 is a side view of the pedal arrangement with one side wall of the pedal housing partly removed to show the interior mechanism. Foot plate 54 is hingedly fastened to hinge plate 23 and carries on its underside solenoid yoke 56 and slide guides 57, 58. Yoke 56 serves to retain solenoid 59 which has a central axial aperture aligned with similar apertures in yoke 56 to receive solenoid plunger rod 61 of magnetic material. Plunger 61 is rigidly fastened to slide 62 which is retained loosely for axial motion in slide guides 57, 58. A compression spring 63 urges slide 62 away from yoke 56. Connecting rod 64 is pivotally fastened at its respective ends to slide 62 and to the normal accelerator pedal 8 in any suitable manner, as by means of a hinge plate 67 which is screwed or otherwise fastened to the pedal 8. The usual push rod 7 of the gas pedal linkage extends through the floor board and operates in the customary manner. The arrangement is such that when the solenoid is energized, plunger 61 is held immovable relative thereto by magnetic attraction and therefore pressure exerted on pedal 54 will be transmitted through the linkage including connecting rod 64 to the normal accelerator pedal 66 and thus to push rod 68 to increase the gas feed. The circuit of solenoid 59 is normally closed through switch 41 (see Fig. 2) and therefore, upon overspeed, this circuit will be opened and the solenoid will be deenergized. When this occurs, plunger rod 61 is free to slide loosely in solenoid 59, which it does when the pedal is depressed, without transmitting force or motion to push rod 7. Even if the pedal 54 is depressed at its lowest position, as shown in Fig. 5, pedal 55 is still in its idling position and the engine will turn over only at its idling speed. However, if it is desired to use the full throttle, for example, when climbing a hill, or when accelerating, if the vehicle is not moving above the preset speed, then full connection will be maintained and full motion will be transmitted to pedal 66 as shown in Fig. 6, to provide maximum gas feed to the engine.

Fig. 9 shows a modification of the pedal construction using a mechanical latch between the special pedal 54' (corresponding to pedal 54 of Fig. 7) and the normal pedal 66. The linkage is the same as before except that plunger rod 61' is not held directly by magnetic attraction, but is instead restrained from motion by armature 60 which is held down by solenoid 59'. When the solenoid is deenergized, plunger 61' pushes the arm 60 aside against the action of light spring 71, and no force can be transmitted to the gas feed linkage, as shown in Fig. 10. After the speed is reduced and the solenoid again energized, the pedal 54' must be eased up to the idling position again before the armature 60 will re-latch into the position shown.

Figure 7:
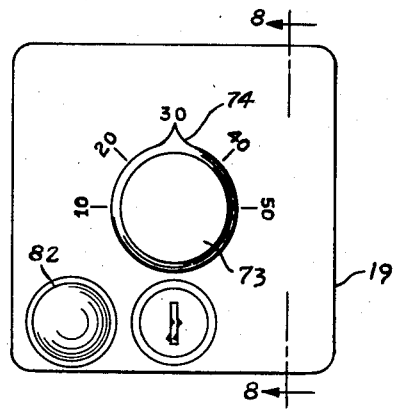
Fig. 7 is a front view of the auxiliary panel and housing for the setting control and key lock.
Figure 8:
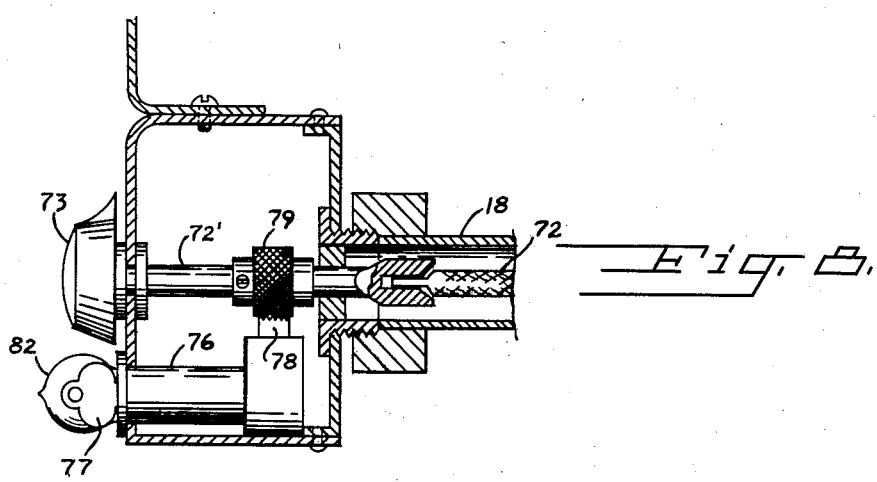
Fig. 8 is a sectional view taken on line 8—8 of Fig. 7.

Fig. 7 shows a front view and Fig. 8 a side view of housing 19 for the speed setting means. Cable 18 contains central wire 72 which is attached at one end to threaded screw member 51 (Fig. 2) and at the other through rod 72' to setting knob 73, so that rotation of the knob rotates the screw 51 and causes axial adjustment of the position of switch stack 41, 44. The forward face of housing 19 may be suitably calibrated for the various speed settings and a pointer 74 on knob 73 indicates the speed setting at which the governor control comes into play. A lock 76 is provided with a key 77 and has a bolt 78 with a roughened or serrated end arranged to engage a knurled or serrated collar 79 fixed to rod 72' to lock the wire against rotation except when the bolt is withdrawn, which can only be done by the use of key 77. Thus the device can be set by the holder of the key and by no one else, and unauthorized change of the speed setting is prevented.

If desired, a signal lamp 82 may be provided in the housing 19, and may be controlled by switch 44 to give warning that the governor is about to take over control. Alternatively, a buzzer or audible signal may be used. In vehicles equipped with conventional turn indicators which cause a flashing light to flicker on the dash and produce an audible ticking signal, switch 44 may be wired to the turn indicator to use it as the warning device. This will not interfere with normal use of the turn indicator, since the driver would not be making a sharp turn at the relatively high speed at which the governor takes effect.

Figure 11:
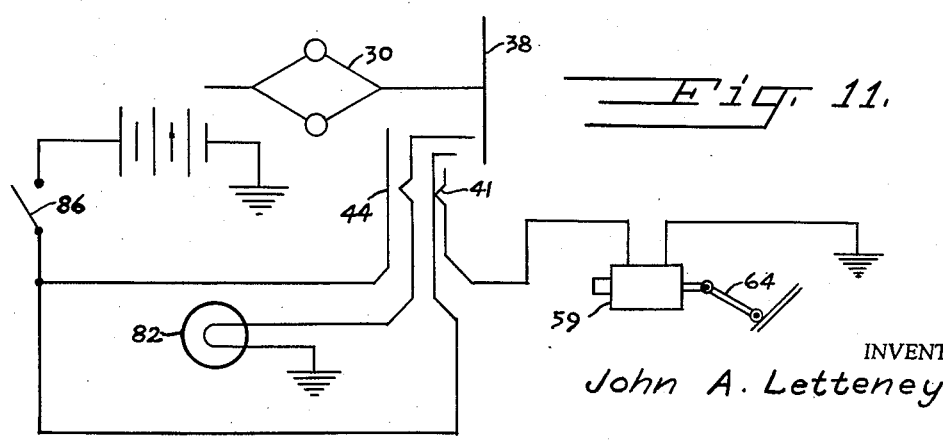
Fig. 11 is a schematic circuit diagram of the invention.

Fig. 11 shows a typical circuit arrangement according to the invention, with the reference numerals corresponding to those in the other figures. Switch 86 represents the ignition key switch circuit, since it is, of course, desirable to have the solenoid circuit turned off when the car is not in use. It will be noted that if the speed control setting is turned to zero speed and key 77 removed, the vehicle cannot be operated by the ignition key alone, but will require key 77 to set the governor back to a range useful for normal driving.

Fig. 12 shows how the standard gas pedal 66 may be eliminated, and the link 64'', corresponding to link 64 of Fig. 4, may be connected directly to push rod 7'', as might be done if the mechanism is installed as original factory equipment instead of as accessory equipment.

It will be apparent from the above description that a speed control governor system has been provided in accordance with the stated objects of the invention. The system is capable of installation in any make of vehicle, and requires neither skilled installation nor alteration of existing components of the vehicle. It should be noted that some automobiles have the gas feed controlled not by a push rod through the floor board, but by a bell crank lever arrangement operated from the hinged end of the accelerator pedal. However, this requires no change in the installation procedure of the above described system since it cooperated directly with the foot pedal regardless of the mechanical connection employed between the pedal and the carburator valve. In modern automobiles, there is often very little space under the hood for the installation of extra components or linkages, but since the connection between the various components of the above described system is by means of flexible cables or conductor, these components can readily be located wherever there is available space, so that they are adaptable to any make or type of automotive vehicle.

It will be apparent that the embodiments shown are only exemplary and that various modifications can be made in construction and arrangement within the scope of my invention as defined in the appended claims.

I claim:

1. In combination with a motor vehicle having a speedometer shaft, a standard foot-pedal for fuel control, a speed-controlled switch driven from said shaft, a special foot-pedal overlying said standard foot pedal, a mechanical connection between said two pedals for transmitting motion from said special pedal to said standard pedal, electrically actuated means for disabling said mechanical connection, and circuit means between said disabling means and said speed-controlled switch for disabling said mechanical connection when a predetermined speed of the vehicle is reached.

2. In combination with a motor vehicle having a driver's compartment including a floorboard, a throttle control linkage having an end extending through said floor board into said compartment, a shaft driven in accordance with the speed of the vehicle, a speed-responsive element driven by said shaft, an electric switch actuated by said speed-responsive element for operation at a definite speed, means for setting the operating speed of said switch at a desired value, a foot-pedal on said floorboard, a mechanical connection entirely in said compartment between said pedal and the said end of said throttle control linkage for transmitting motion from said pedal to said linkage, and electrically actuated means controlled by said electric switch for disabling said mechanical connection when said definite speed is attained.

3. In combination, a gas feed pedal for an automotive vehicle, a casing overlying said pedal so as to prevent access thereto, said casing being mounted for limited motion with respect to said pedal, connecting link means between said casing and said pedal for transmitting limited motion from said casing to said pedal, and speed-controlled means for disabling said connecting link means to enable independent and relative motion of said pedal and casing whereby said casing can no longer transmit motion to said pedal.

4. The invention according to claim 3, said disabling means including a solenoid and means under control of said solenoid for locking and releasing said connecting link means to respectively lock and release the pedal and casing.

5. The invention according to claim 4, and a speed-controlled switch for energizing and deenergizing said solenoid in accordance with a predetermined speed condition.

6. The invention according to claim 5, and remote-control means for setting the predetermined speed condition at which said speed controlled switch operates.

7. A gas pedal for an automotive vehicle comprising a special pedal element formed as a hollow casing; means for fastening said special pedal element to the floor-board of a vehicle, a connecting link element inaccessably mounted within said casing and having connecting means at one end thereof for connection to an end of the fuel feed control system of an automotive vehicle within said casing, electrically controlled means for establishing a substantially rigid mechanical connection between said pedal and the other end of said link element, and electrical means for disabling said rigid connection.

8. The invention according to claim 7, said electrical means comprising a solenoid element, and a magnetic member under control of said solenoid element for establishing a rigid connection between said pedal and said link.

9. The invention according to claim 8, said magnetic member comprising a magnetic core element movable with respect to said solenoid element when the latter is deenergized, one of said two last-named elements being fixed to said pedal and the other fixed to said link, said core element being held immovable with respect to said solenoid element when the latter is energized.

References Cited in the file of this patent

UNITED STATES PATENTS

| | | |
|---|---|---|
| 1,401,396 | Davis | Dec. 27, 1921 |
| 2,111,284 | Girl et al. | Mar. 15, 1938 |
| 2,494,422 | Wilson et al. | Jan. 10, 1950 |
| 2,676,220 | Schlitz | Apr. 20, 1954 |
| 2,677,733 | Haley | May 4, 1954 |